United States Patent [19]
Schneider

[11] Patent Number: 5,626,013
[45] Date of Patent: May 6, 1997

[54] CIRCLE-CRANE MATERIAL HANDLING SYSTEM

[76] Inventor: John R. Schneider, 4 Woodside Dr. East, Apalachin, N.Y. 13732

[21] Appl. No.: 312,524

[22] Filed: Sep. 26, 1994

[51] Int. Cl.$^6$ ............................................. F16G 13/20
[52] U.S. Cl. ............................ 59/78; 59/84; 198/851
[58] Field of Search ........................... 59/80, 78, 84, 59/5; 474/206, 234, 235; 198/850, 851, 853

[56] References Cited

U.S. PATENT DOCUMENTS

| | | | |
|---|---|---|---|
| 268,883 | 12/1882 | Gowan | 474/234 |
| 593,685 | 11/1897 | Parry | 474/206 |
| 1,831,951 | 11/1931 | Fassnacht et al. | 59/80 |
| 1,937,304 | 11/1933 | Worrall | 198/851 |
| 2,602,345 | 7/1952 | Braumiller | 59/84 |

FOREIGN PATENT DOCUMENTS

| | | | |
|---|---|---|---|
| 312812 | 2/1918 | Germany | 198/851 |
| 2948689 | 6/1982 | Germany | 198/851 |

*Primary Examiner*—David Jones
*Attorney, Agent, or Firm*—Salzman & Levy

[57] ABSTRACT

For the movement of work-in-process materials on a storage or manufacturing floor, a grid of computer-controlled, unmanned jib cranes is established. The cranes' operational areas overlap. A crane can place an individual part or a magazine of parts on an elevated, revolving pedestal which then automatically rotates 180 degrees so that the next crane in line can pick up these materials and move them into its own area. The hand of the crane is moved so that it can place its load directly into the position in the machine tool where it undergoes its next process. The arm of the jib crane is fully retractable and computer-controlled, using a laser integrated into the computer's system to aid in detecting the crane's hand location at each delivery position that the crane visits. The jib cranes can lift parts up to a level that places them near the ceiling of the manufacturing floor area. The crane arm then begins to swing and extend (or retract, as necessary) to transport the part or parts to the next operational position required in the manufacturing or storage process.

12 Claims, 8 Drawing Sheets

CIRCLE-CRANE MATERIAL HANDLING SYSTEM

FIELD OF THE INVENTION

The present invention pertains to a manufacturing material handling system and, more particularly, to overhead cranes for use in moving material in a manufacturing area.

BACKGROUND OF THE INVENTION

Moving work-in-process materials inside a manufacturing area has commonly been with wheeled vehicles, conveyance devices (such as overhead cranes controlled in real time by a human operator) and powered or gravity-feed conveying systems (utilizing belts, rollers, etc.). With wheeled vehicles, much floor space has to be given up to open areas in order to permit the vehicles room in which to maneuver. There have also been several control problems inherent to wheeled vehicles, creating traffic jams and lapses in proper computer control, all of which results in severe inefficiencies. In the case of overhead crane systems, few of them can run without the crane operator's constant attention; indeed, a second person must usually act to hook the crane to the load, guide the crane operator's actions with hand signals and, finally, unhook the load at its destination. Gravity and belt- or roller-powered conveyors also require much floor space for their installation. In addition, the finished conveyor system is usually quite product-specific, exhibiting little tolerance for new products to be integrated onto the manufacturing floor.

For transporting items substantially horizontally, conveyor belts and other mechanisms typically require, for support, structure on both ends of the conveying means. Unfortunately, the support scheme often requires additional floor space and/or complexity of apparatus. Moreover, due to the nature of such supported conveying means, the overall length is generally fixed. The foregoing constraints limit the flexibility of such conveying systems.

While the use of chains provides flexibility, there has been a long sought need to develop a chain that need not be supported on both ends. A flexible chain and rigid bar combination was disclosed in U.S. Pat. No. 4,885,907 (issued to Sofia Pappanikolaou). This so-called chainbar requires separate locking mechanisms and a plurality of moving parts, which are susceptible to failure under load.

U.S. Pat. No. 1,004,575 (issued to J. M. Jones) also addresses the support problem by providing hook prominences. Unfortunately, such prominences tend to catch on fabric and other extraneous objects. Moreover, no provision is made to accommodate the drive sprocket teeth which are normally expected to drive the chain when in use by engaging slots in the chain placed in line at regular intervals.

U.S. Pat. No. 553,650 (issued to P. S. Kingsland) discloses a lock chain which is rigid only when first laid straight and then compressed end-to-end. Such a procedure is not conducive to modern material handling operations.

It would be advantageous to eliminate the use of wheeled vehicles for moving work-in-process, saving floor space in a manufacturing area.

It would also be advantageous to replace the overhead crane operators with full-time computer control, removing the potential for human error and reducing the number of people needed to operate in a given manufacturing floor area.

It would be further advantageous to reduce the transportation time of parts, minimizing the amount of work-in-process inventory needed in a manufacturing area.

It would be yet advantageous to keep all movement of work-in-process (WIP) off the floor level and place it overhead. This would minimize the danger of accident by eliminating the mixing of WIP transportation with human activities at floor level, effectively eliminating floor conveyor systems in manufacturing plants which make individual pieces of a product. This thereby saves much floor space and provides a system that can be much more receptive to the introduction of new products on the manufacturing floor.

SUMMARY OF THE INVENTION

In accordance with the present invention, there is provided a material handling system for moving and placing items within a manufacturing area or material distribution center. A number of isolated cranes are rotatably mounted on respective columns. Each of the cranes has a maneuverable, retractable arm; along the length thereof is a mechanism for picking a load and moving it vertically. The elevated crane then rotates to move the load horizontally. A lazy-susan type of turntable is provided so that elevated items placed on it by one crane can be rotated horizontally to another position, where yet another crane can pick the load from the lazy-susan and continue the load on its traverse of the floor area. Other mechanisms for moving items horizontally from one point to another can also be used. Finally, a computer controller is connected to each of the cranes. Thus, an item placed by one of the cranes can be moved from a first position to a second position in preparation for being picked up by another crane for further handling.

It is an object of the present invention to produce a completely automatic, computer-controlled WIP material handling system without the need for human intervention. Said material handling system has the ability to remove a manufactured part from a machine tool where it has just completed one processing step and place it into the next machine tool for the next manufacturing process step.

It is a further object of the invention to provide a means of eliminating WIP from the conventional storage site on the manufacturing floor, moving any storage site needed into currently unused areas of space immediately below the plant's ceiling.

It is a more detailed object of the present invention to reduce the amount of human effort needed to manufacture a product by making the material handling activities involved in that manufacture completely automatic.

It is still a further object of the invention to provide a system that is versatile enough to readily adopt new products into its glossary of control programs and integrate that controlled movement with that of all other existing products made on that manufacturing floor.

It is yet a further object of the invention to provide a conveying mechanism, such as a chain, which is self-supporting and locking in all but one direction, so that it may be wound when not in use.

BRIEF DESCRIPTION OF THE DRAWINGS

A complete understanding of the present invention may be obtained by reference to the accompanying drawings, when considered in conjunction with the subsequent, detailed description, in which.

The invention will be better understood and become more apparent hereinafter with reference to the detailed description. For the sake of brevity, like elements and components will bear the same numerical designations throughout the FIGURES.

It is evident that this system of material handling could be installed in many more applications and situations than a manufacturing floor scenario; however, the manufacturing floor scenario is the one chosen to explain this invention.

DESCRIPTION OF PREFERRED EMBODIMENTS

Figure 1:
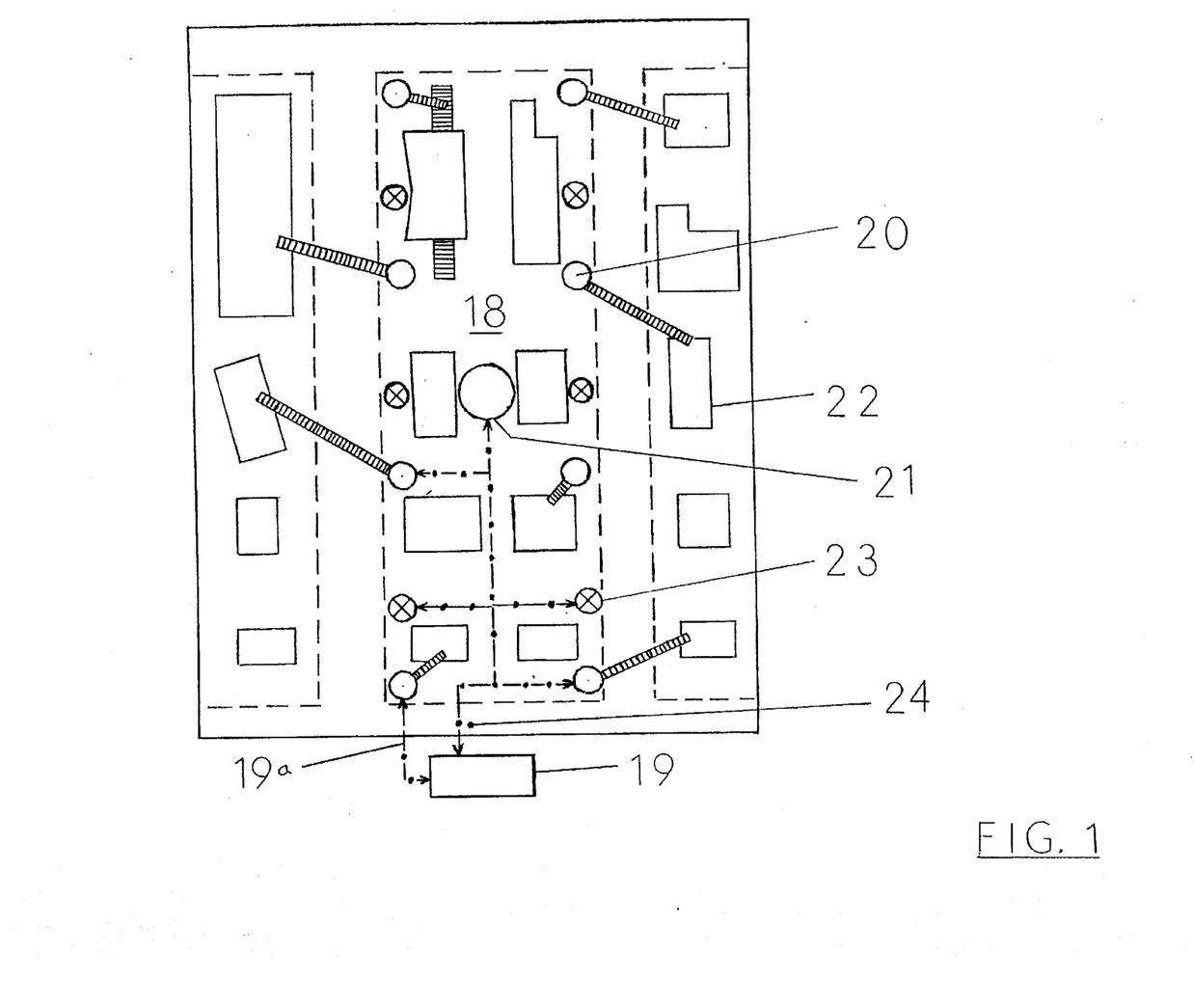
FIG. 1 is a view of a complete manufacturing floor, showing one possible layout for the placement of the circle crane of the invention and showing the overlapping areas of influence of neighboring cranes, with one type of aisle layout possible therein.

Shown in FIG. 1 is a control computer 19, such as an IBM® personal computer or other suitable processor, disposed at a remote location. Control computer 19 is adapted to control (via lines 19a) each of eight circle cranes 20 placed in a four-by-two matrix. The cranes 20 are disposed relative to one another so that they can span the entire manufacturing floor 18 as shown, servicing pieces of manufacturing equipment 22 in all of their equipment positions on that manufacturing floor 18. Work-in-process parts, not shown, are moved from one piece of manufacturing equipment 22 to another 22 by use of these circle cranes 20. If one piece of manufacturing equipment 22 is out of reach of one crane 20, then that crane 20 will deposit the part or magazine of in-process parts onto the revolving pedestal 23 positioned on the most direct route to the next operational site of processing. After the deposit of the part onto the revolving pedestal 23, the crane 20 is free to obtain information on its next move from control computer 19.

The same remote system control computer 19 will schedule the adjacent, neighboring circle crane 20 to swing to pick up the part left on top of the revolving lazy-susan pedestal 23 by the previous circle crane 20. The revolving lazy-susan pedestal 23 revolves 180 degrees, enabling the receiving crane 20 to pick up the part or parts magazine in the same orientation in which the previous crane 20 had held it. If temporary storage is necessary for the in-process parts, the circle crane 20 places them into the revolving lazy-susan shelves 21. An aisleway 24, shown bordered by dotted lines, defines the reduced space necessary for aisle traffic when all of the parts are moved overhead.

The circle cranes 20 may be fitted with robotic hands and wrists 29 (FIG. 2), so that they can place a part directly into the grip of the manufacturing equipment without the help of an operator, or they can be programmed with a simple gripping device 29 to deliver the part or parts to a lay-down space, where an operator will later come to retrieve the part for processing.

Figure 2:
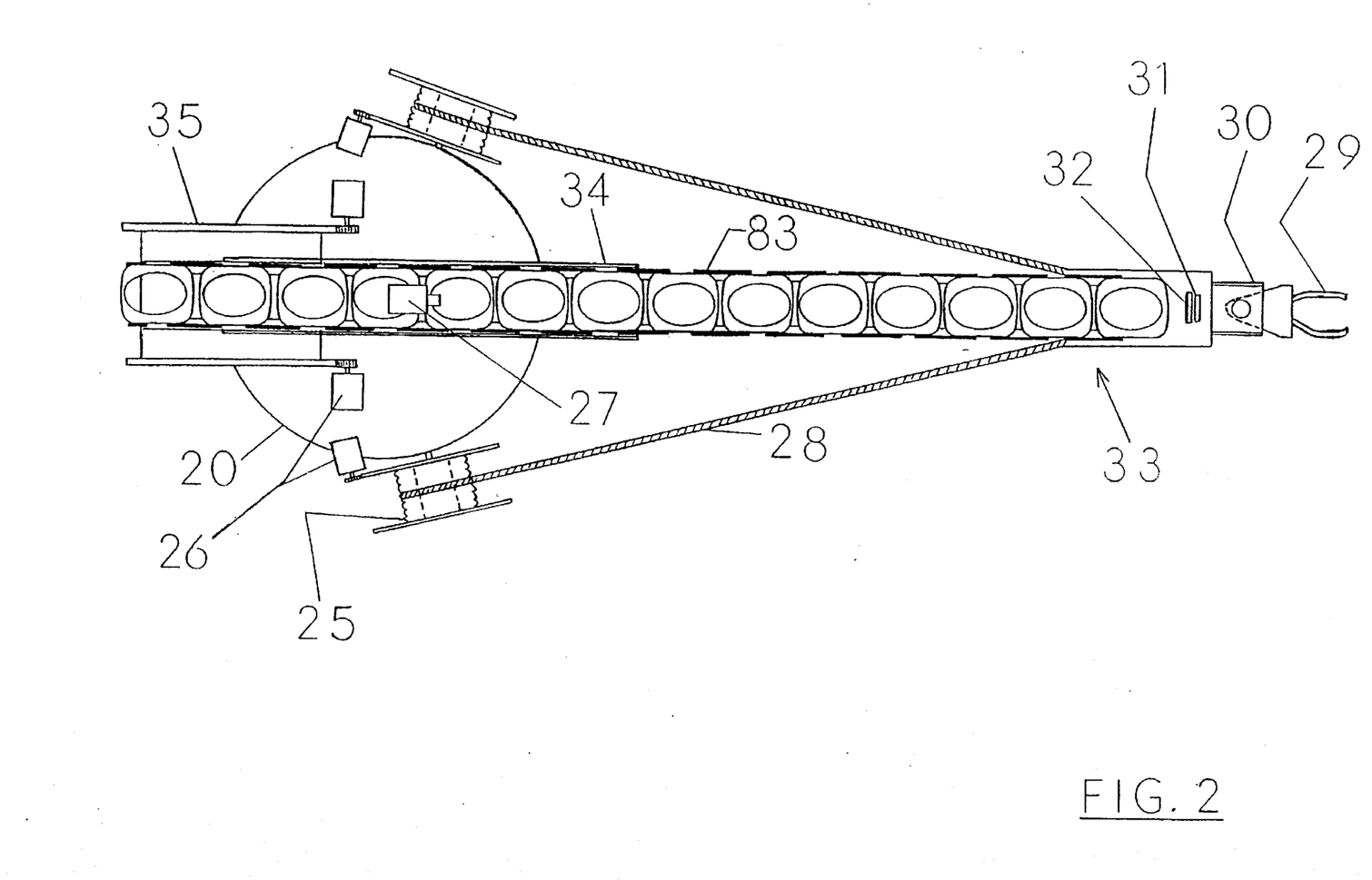
FIG. 2 is an overall, top view of a jib crane head, showing the general placement of the various major components that make its unique function possible.

Now referring to FIG. 2, the plan view of the circle crane 20 shows stepping motors 26 which are computer-controlled and used to reel cables 28 in and out so as to flex the crane arm 33 into proper position. This flexing is accomplished when one or the other of these two cables 28 is tightened or loosened by the action of rotating cable drums 25, to which these cables 28 are attached. This rotating drum 25 is computer-controlled and is in response to feedback from laser-beam targets 31 and 32 reacting to a laser beam 48 (FIG. 5) projected by laser 27.

As the crane arm 33 is moved in three-dimensional space, the crane hand 29 is positioned so that a part, a magazine of parts, a container of liquids or a container of finely divided solids, etc., which is being transported can be placed accurately enough to feed said material into the gripping jaws or chuck jaws of a machine tool. This action is accomplished when the computer 19 instructs the crane 20 to be swung by its stepping motors 26, which drive it so that it is on the proper radian to be the exact one for the desired delivery location. The arm 33 is then extended or retracted along that radian by other stepping motors 26 under computer control, until it has reached the exact distance for the delivery of the materials.

The computer 19 then reads the signals it receives from the laser targets 31 and 32 and determines how much adjustment is needed for the final positioning of the arm load for proper delivery. The cables 28 are then pulled, flexing the hand 29 at the end of the arm 33 until the targets 31 and 32 report that the laser beam 48 was projected through the center hole in target 32, thus proving that the hand end 29 of the crane 20 is now in perfect position to deliver or retrieve a load.

Depending upon where the laser beam 48 first hits the target 31 or 32, the computer 19 can adjust the hand end 29 of the crane arm 33 up or down or left or right (or any combination thereof) in order to seek and find the proper alignment stored in computer memory for that delivery site. Any amount of distance that is off-center is detected by the light receptor cells 46 (FIG. 6) in target 32. Adjustments are made as described until the laser beam 48 projects through the center hole 47 in target 32, striking the photocell on target 31 and thereby signalling the computer 19 to stop the cable tensioning adjustments, as proper positioning has been achieved. Target 31 then reads the length of the distance that the arm 33 is extended by using the laser beam's capabilities, thereby achieving highly accurate distance measurements. Any error in the extension of the arm 33 is then corrected by an adjustment, using the stepping motor 26 and associated worm-drive mechanism, not shown, built into the hand receptacle 30 for that purpose.

Figure 3:
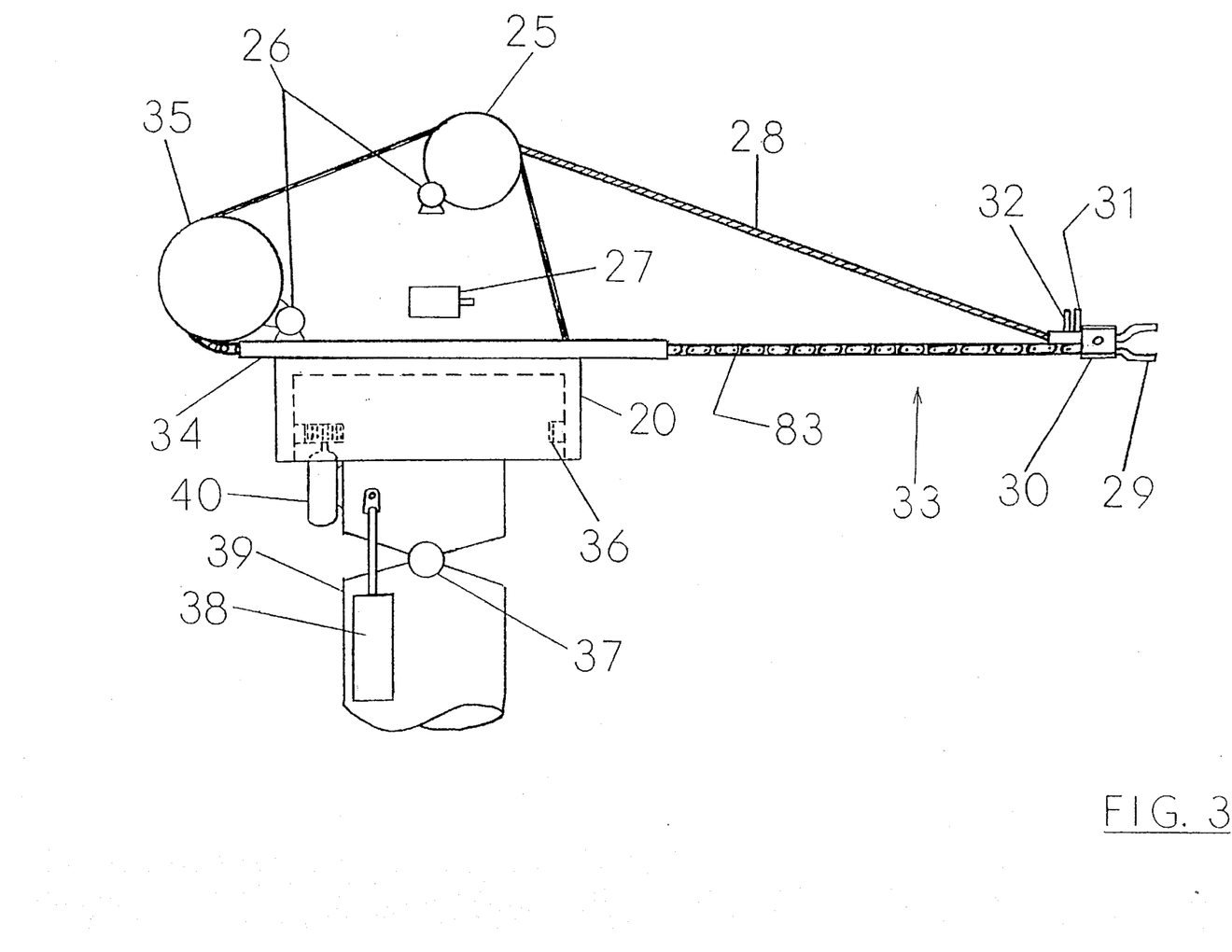
FIG. 3 is an overall, side view of the jib crane head illustrated in FIG. 2, showing the general placement of the various major components that make its unique function possible.
Figure 4:
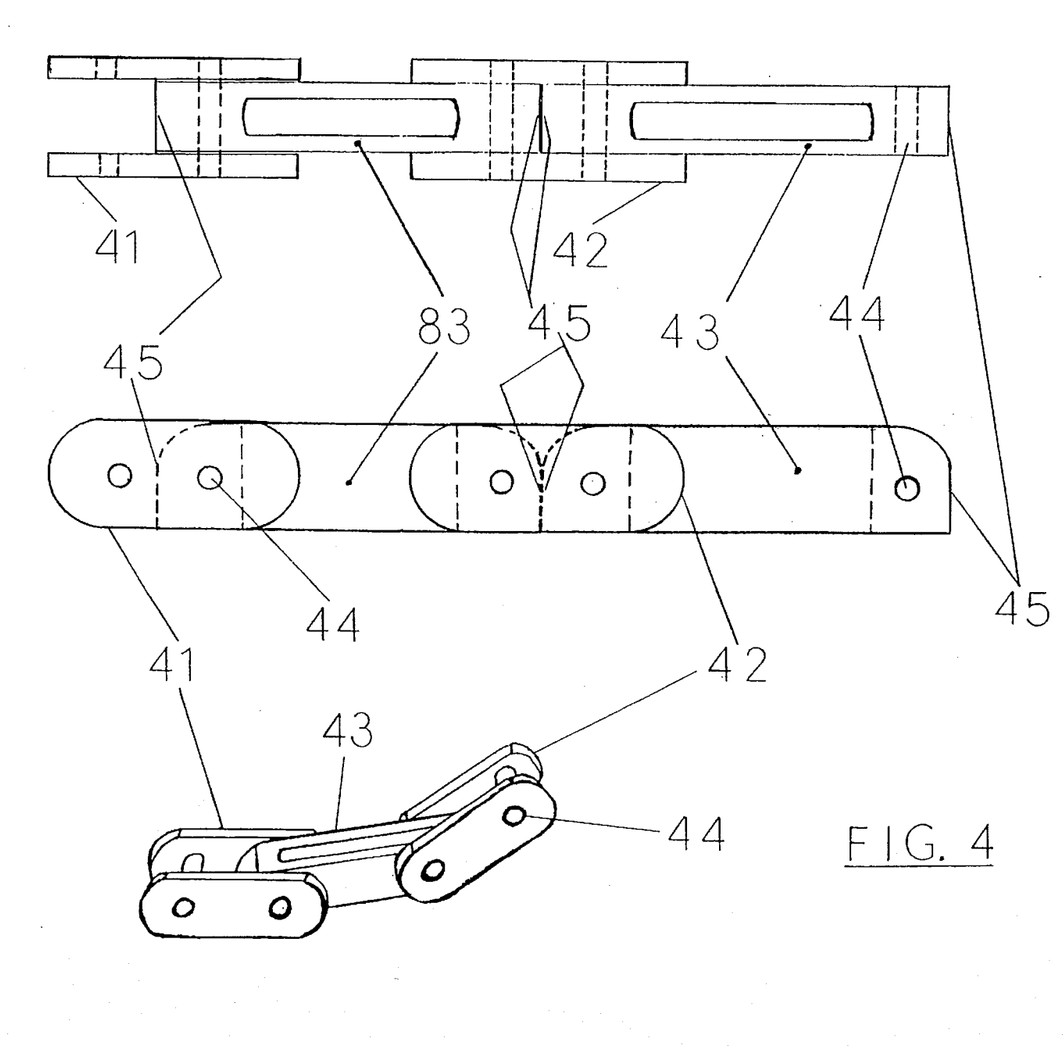
FIG. 4 illustrates the unique configuration of the chain-link design that provides butting surfaces at the end of each link thereof, on each of its two ends, the chain being the major operating structure incorporated into the crane arm of the jib crane head that is shown in FIGS. 2 and 3.

Now referring to FIG. 4, the mechanical strength of the crane arm 33 (FIG. 3) is due to the one-way chain 83 which unreels from reel 35 and is guided by ramp 34. FIG. 4 shows how the pivot links 42 and the main links 43 of chain 83 form a rigid, linear structure in one direction, yet allow the chain 83 to bend to any extent and roll into a coil onto its take-up reel 35 in the opposite direction. This rigidity provides for a crane's required load-bearing strength, in order to support its load in the desired fashion. Turning the reel 35 to force the attached chain 83 out onto chain guide ramp 34 forces the chain 83 to extend out as far as the turning of the reel 35 pushes it. Once properly extended, the chain 83 may be restrained by the sides of the guide ramp 34 to firmly hold it in that desired position.

Now referring again to FIG. 3, the side view of the crane 20 displays the hand receptacle 30 which contains such stepping motors, gears, worm drives and pneumatics as provide for all necessary motions of the hand 29 at the end of the crane's arm 33. All necessary electric power hydraulics, pneumatics and control signals needed to operate the hand 29 are carried through cables 28.

Hand receptacle 30 also supports the laser targets 31 and 32. Stepping motor 40 drives ring gear 36 to rotate the crane assembly to swing to any of its computer-addressed radians through 360 degrees. A steel support pipe 39 is anchored to a block of concrete foundation, not shown, placed into the shop floor 18; this acts as an inertial block in keeping the entire crane assembly upright. Hydraulic cylinder 38 is computer-controlled in order to tilt the crane 20 on pivot pin 37, so that it can reach loads and delivery points close to its base.

The view of the chain's link configurations in FIG. 4 displays the abutment surfaces 45 cast into both ends of the right main link 43 and the left main link 43. These surfaces 45 are held in place by pivot links 41 and 42, which are, in turn, anchored in place by pivot pins in holes such as hole 44. This assemblage causes the main chain links 43 to butt up against one another, so they can go no farther, pivoting into a straight, rigid structure when forced by the weight of a load, not shown, to move against a neighboring link's abutment surfaces 45. When pivoted away from these abutment surfaces 45, the chain 83 bends easily in the opposite direction to conform to any radius demanded of it.

Figure 5:
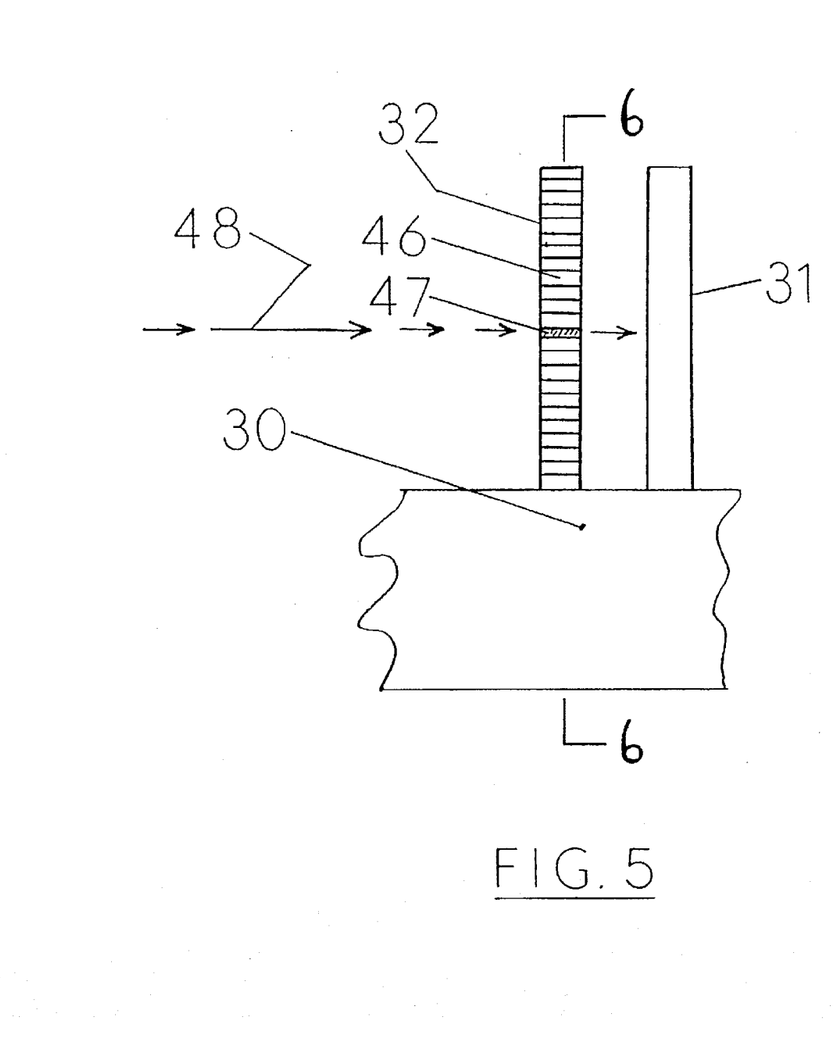
FIG. 5 depicts the laser target mounted at the hand end of the crane's arm, which provides feedback to the computer, indicating which way the arm must be moved, in three-dimensional space, to a position compatible with its desired pick-up or deposit position.
Figure 6:
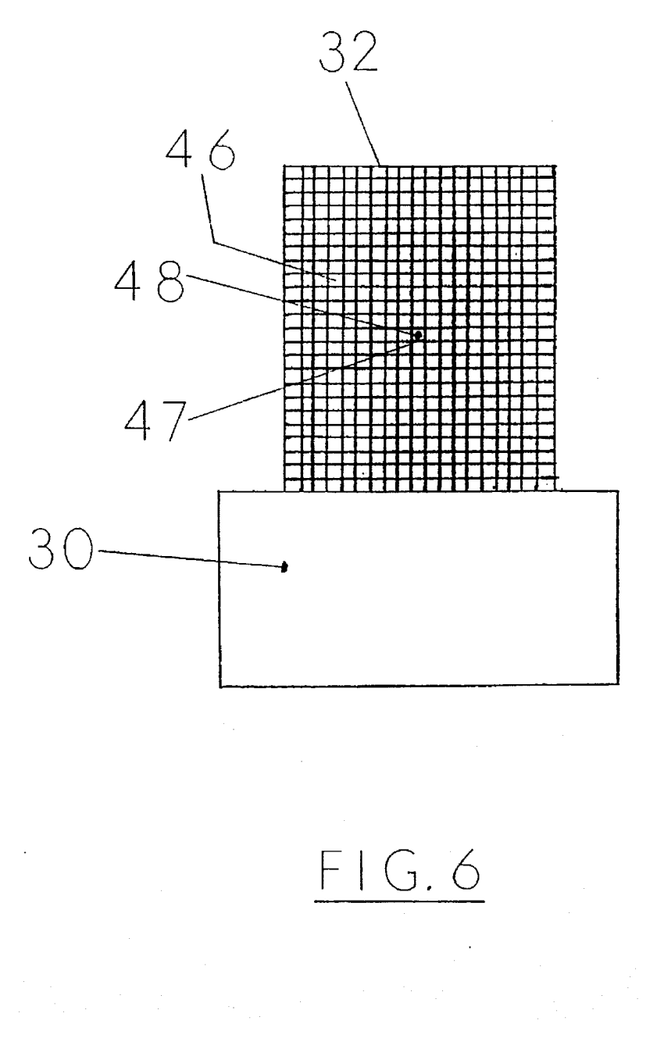
FIG. 6 is a sectional view taken on line 6—6 of FIG. 5.

Now referring to FIGS. 5 and 6, illustrated is the laser target's detailed matrix of photocells 46 which are mounted on the hand receptacle 30, allowing the computer 19 to detect the existence of any misalignment of the crane's hand 29 from a nominal position in three-dimensional space, which is stored in the computer's memory. Laser beam 48, as generated by laser 27, is shown projecting through the center hole 47 in target 32 to strike the "on target and distance measuring" photocell or mirror, not shown, housed in target element 31, thus communicating to the computer 19 that proper crane hand alignment has been achieved. Should there be any misalignment, so that the hand end 29 of the crane arm 33 is skewed from the projection of the laser beam 48 along the center line of the crane arm 33, the computer 19 will cause the cables 28 to pull the hand end 29 of the crane arm 33 into perfect alignment with the laser beam 48.

The computer 19 then utilizes the laser 27 to determine the distance to the hand 29 from the center line of the crane support 39 (FIG. 3); if that information matches that which is stored in the computer 19, then the crane hand 29 can make its final movement to insert the part or deliver the load into the open grip of whatever receptacle awaits. The computer's stored information for each final delivery or pick-up movement of the crane's hand 29 may be different for each delivery position and product. The computer 19 will track, with the aid of its memory, all jobs on the manufacturing floor and know what type of part it is expected to pick up or deliver at each piece of equipment. If desired for additional control of the identity of parts, a self-adhesive tag with bar-code information (identifying the part or container of parts) can be adhered. This will also enable another laser beam, not shown, to read and thereby confirm the identity of the part type it is currently handling. An ink-jet printer, not shown, can be incorporated into the design of the crane's hand 29 and used to mark current information onto the adhesive tag each time that the crane 20 handles a part. That part's progress through the manufacturing system can thereby be identified by computer reading, using a laser to scan the updated bar-code on each part handled as it is encountered.

Figure 7:
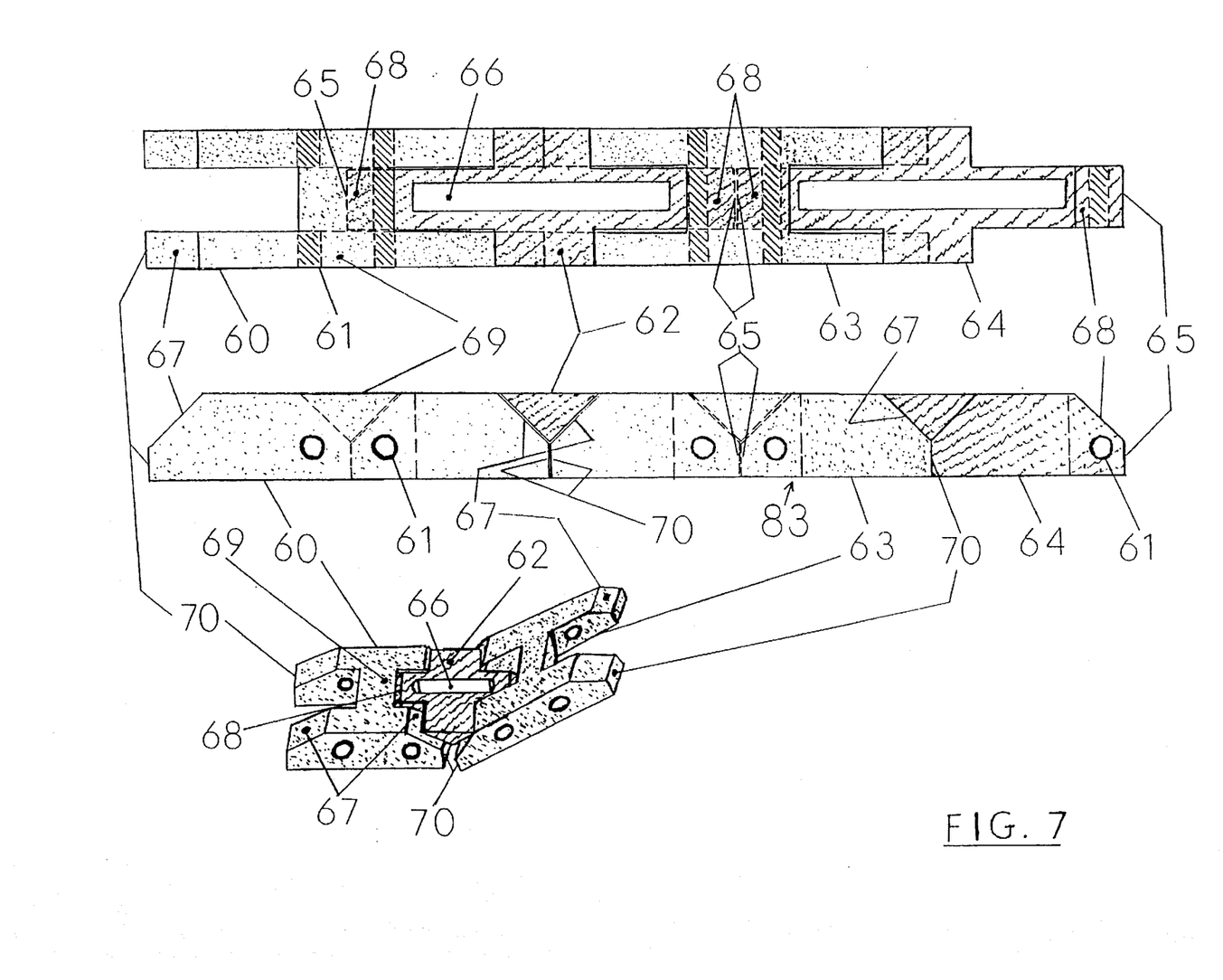
FIG. 7 shows an alternate embodiment of chain-link design that provides additional abutting surfaces at the ends of the links and in the middle of each link.

Now referring to FIG. 7, a view of a second, more rugged chain-link configuration displays abutment surfaces 65 and 68, which are cast and machined flat into both ends of the right main link 64 and the left main link 62. These surfaces 65 and 68, held in place by the pivot pins 61 to the pivot links 60 and 63, cause the main chain links 62 and 64 to butt up against each other's abutment surfaces 65 and 68, as well as against the pivot links' abutment surfaces machined on the underside of the center connecting member 69 of pivot links 60 and 63. These blocking abutment surfaces 65, 68 and 69 in concert stop the links 60, 62, 63 and 64 in the chain, so that they can go no farther; they all pivot, therefore, into a straight, rigid structure when forced by the weight of a load to move against their adjacent, neighboring link's abutment surfaces. When pivoted in the opposite direction of these abutment surfaces, the chain 83 bends easily in the opposite direction to conform to any radius demanded of it.

Additional abutment surfaces for extra strength are shown being formed by the underside surfaces of the metal forming the midsection 69 of pivot links 60 and 63 and by the ears cast and machined flat on their bottom surfaces, located at the midsection of the main links 62 and 64. Therefore abutment surfaces 68 mate with surfaces 69, surfaces 65 with one another, surfaces 70 with one another, and surfaces 67 with surfaces 62. To complete the design of the chain 83, sprocket holes 66 are cast and machined into the center of each main link 62 in the chain 83. This allows a drive sprocket, not shown, to manipulate the chain assembly onto and off its holding reel 35 (FIG. 3) and to extend and retract the arm 33.

Figure 8:
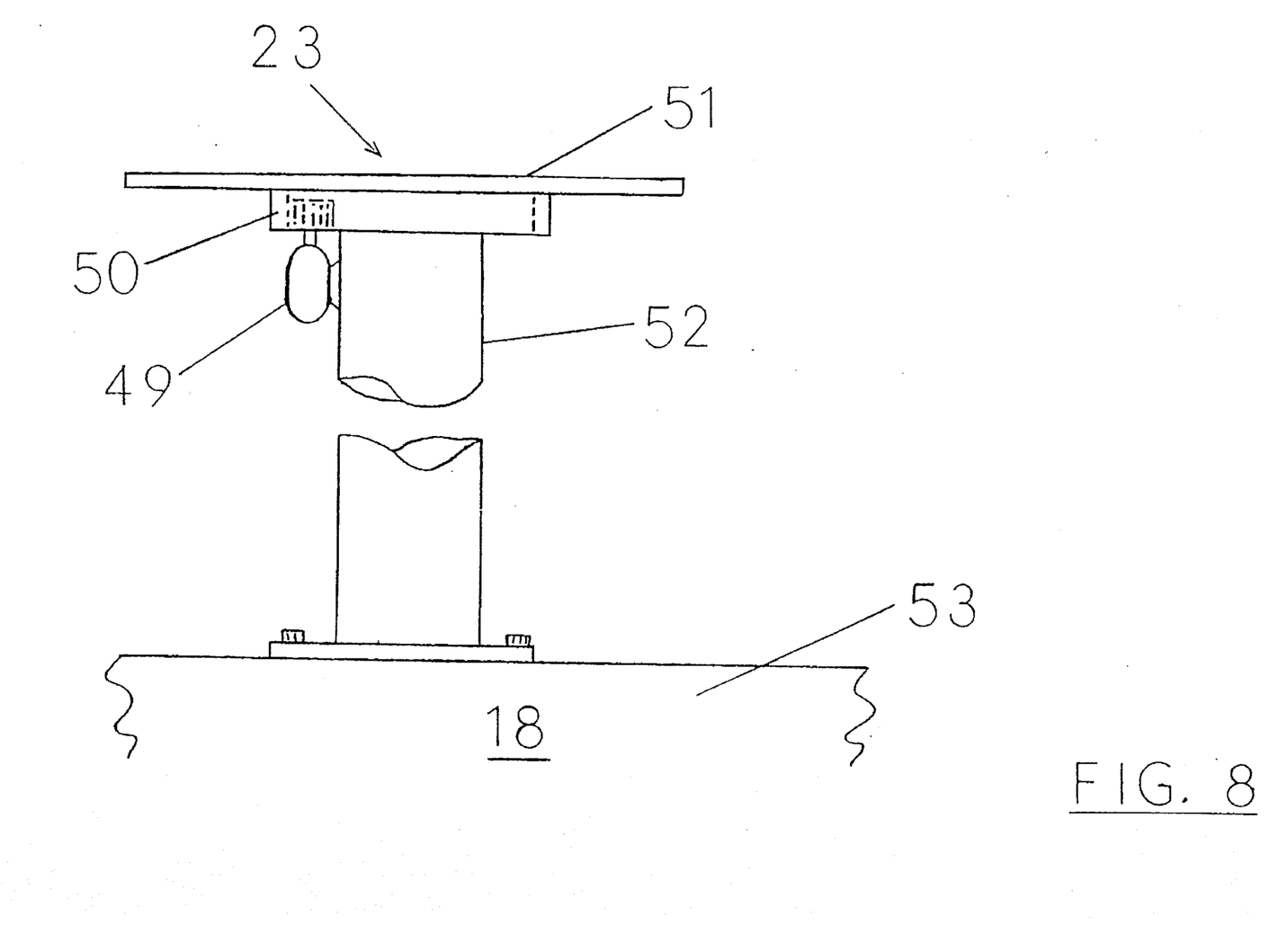
FIG. 8 is a view on an enlarged scale of the computer-controlled, elevated, revolving lazy-susan pedestal which receives parts from one crane at the edge of its area of influence and presents these parts to the next crane in line.

Now referring to FIG. 8, the rotating lazy-susan pedestal 23 (as depicted in FIG. 1) is shown. Its computer-controlled stepping motor 49 is shown engaging ring gear 50, which acts through a large bearing allowing the parts platform 51 to be rotated through all 360 degrees of possible movement. The entire assembly is supported off the shop floor 18 to a height comparable to that of the height of the crane's head assembly (shown in FIGS. 2 and 3) by steel pipe 39, which, in turn, is anchored to concrete foundation block 53.

Figure 9:
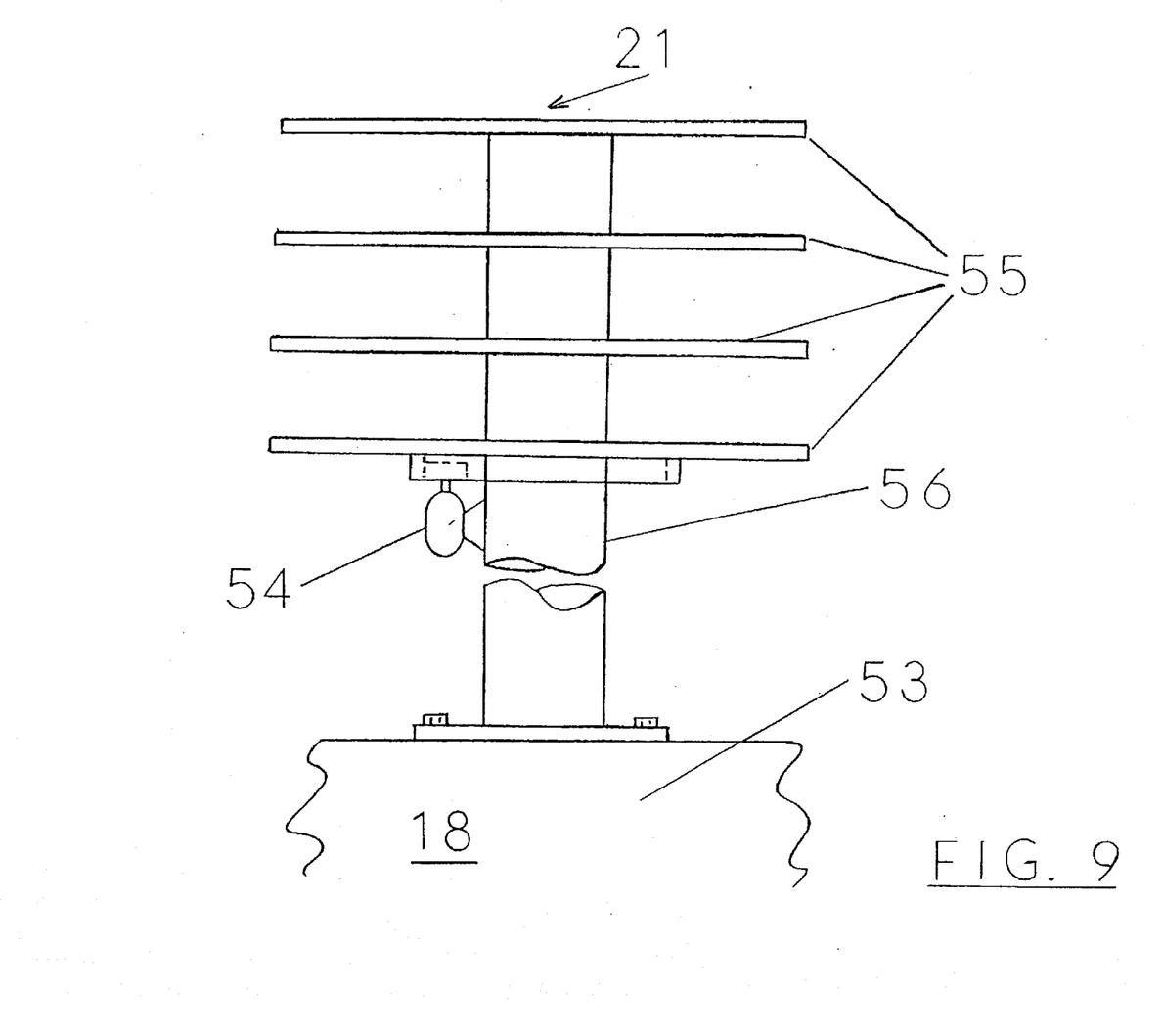
FIG. 9 is a view on an enlarged scale of the computer-controlled, elevated, revolving, lazy-susan shelf parts-storage device, which can be integrated into the overall computer-controlled system.

Now referring to FIG. 9, an almost identical structure 21 to the rotating lazy-susan pedestal 23 (FIG. 8) is shown. This rotating lazy-susan shelf 21 is positioned by computer-controlled stepping motor 54, which turns the upper part of the structure 21 through a pivot-bearing supported by steel pipe 56. These two similar structures 21 and 23 allow the crane 20 to release loads onto their respective platforms 55 and 51 for later retrieval by the same or a neighboring crane 20. The lazy-susan shelf 21 is a parts accumulator, using shelves 55 which provide temporary storage for work in process. The rotating lazy-susan pedestal 23, on the other hand, receives a load only from one crane 20, rotates it 180 degrees and presents it to the next crane 20 for further transportation, thus acting only as a way-station for a single crane's load in the circle-crane parts transportation network system.

In some configurations of this system, it could be necessary to mount the cranes 20, lazy-susan shelf 21 and revolving lazy-susan pedestal 23 on floor tracks, not shown, or other mechanical means that would permit their movement across space, rather than having them cemented in a fixed position as hereinabove described.

It is also evident that this system of material handling could be installed in many more applications and situations than a manufacturing floor scenario; however, the manufacturing floor scenario is the one chosen to explain this invention.

Other designs for the hardware devices in this system (such as the one-way chain retracting crane arm, laser targets, cable drums, stepping motors and other integral components of this system) are obvious, once the overall concept taught by this invention is understood; however, the inventor has chosen the designs presented herein to explain the circle crane concept of material handling and to represent one possible working configuration of the system.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A multi-link chain capable of bearing a load, comprising:
   a) a plurality of main links, each having a common first predetermined shape each of which main links has a longitudinal plane and comprises at least one surface at each distal end thereof, said surfaces of said main links having stops; and
   b) a plurality of pivot links, each have a common second predetermined shape complementary to said first predetermined shape, for connecting each of said main links to form a chain assembly, said pivot links each having a longitudinal plane substantially coincident with the longitudinal plane of said main link and at least one surface at each distal end of said pivot links, said surfaces of the pivot links mating with said stops of said main links, so that said main links and said pivot links are prevented, in one direction, from rotating beyond said longitudinal planes thereof.

2. The multi-link chain in accordance with claim 1, wherein said plurality of pivot links are H-shaped.

3. The multi-link chain in accordance with claim 2, wherein said plurality of main links are hollow cross-shaped links.

4. The multi-link chain in accordance with claim 1, wherein each of said main links further comprises a rotation-limiting protuberance for providing said stop, against which one of said surfaces of said pivot links abuts in order to prevent motion thereof beyond said longitudinal plane of said main link.

5. A multi-link chain capable of bearing a load, comprising:
   a) a plurality of main links, each having a common predetermined shape, each of which main links has a longitudinal plane and comprises at least one surface at each distal end thereof, said surfaces of said main links having stops; and
   b) a plurality of pivot links each have a common second predetermined shape complementary to said first predetermined shape, links for connecting each of said main links to form a chain assembly, said pivot links each having a longitudinal plane substantially coincident with the longitudinal plane of said main link and at least one surface at each distal end of said pivot links said surfaces of the pivot links mating with said stops of said main links, so that said main links and said pivot links are prevented, in one direction, from rotating beyond said longitudinal planes thereof.

6. The multi-link chain in accordance with claim 5, wherein said plurality of pivot links are H-shaped.

7. The multi-link chain in accordance with claim 6, wherein said plurality of main links are hollow cross-shaped links.

8. The multi-link chain in accordance with claim 5, wherein each of said main links further comprises a rotation-limiting protuberance for providing said stop, against which one of said surfaces of said pivot links abuts in order to prevent motion thereof beyond said longitudinal plane of said main link.

9. A multi-link chain capable of bearing a load, comprising:
   a) a plurality of main links, each having a common first predetermined shape, each of which main links has a longitudinal plane and comprises at least two surfaces at distal ends thereof, said surfaces of said main Links having stops, each of said main links comprising two sides, said sides being held apart from each other by at least one interposing member connected to each side, respectively; and
   b) a plurality of pivot links, each have a common second predetermined shape complementary to said first predetermined shape, for connecting each of said main links to form a chain assembly, said pivot links each having a longitudinal plane substantially coincident with the longitudinal plane of said main link and at least one surface at each distal end of said pivot links, said surfaces of the pivot links mating with said stops of said main links, so that said main links and said pivot links are prevented, in one direction, from rotating beyond said longitudinal planes thereof.

10. The multi-link chain in accordance with claim 9, wherein said plurality of pivot links are H-shaped.

11. The multi-link chain in accordance with claim 10, wherein said plurality of main links are hollow, cross-shaped links.

12. The multi-link chain in accordance with claim 9, wherein each of said main links further comprises a rotation-limiting protuberance for providing said stop, against which one of said surfaces of said pivot links abuts in order to prevent motion thereof beyond said longitudinal plane of said main link.

\* \* \* \* \*